US012214370B2

(12) United States Patent
Audette et al.

(10) Patent No.: US 12,214,370 B2
(45) Date of Patent: Feb. 4, 2025

(54) DOUBLE TENTACLE PUMP SYSTEM FOR A LIQUID SPRAYER

(71) Applicant: THE FOUNTAINHEAD GROUP, INC., New York Mills, NY (US)

(72) Inventors: David M. Audette, Webster, MA (US); Andrew C. Putrello, Utica, NY (US)

(73) Assignee: THE FOUNTAINHEAD GROUP, INC., New York, NY (US)

( * ) Notice: Subject to any disclaimer, the term of this patent is extended or adjusted under 35 U.S.C. 154(b) by 0 days.

(21) Appl. No.: 18/478,072

(22) Filed: Sep. 29, 2023

(65) Prior Publication Data

US 2024/0024902 A1 Jan. 25, 2024

Related U.S. Application Data

(62) Division of application No. 17/171,391, filed on Feb. 9, 2021, now Pat. No. 11,801,522.

(60) Provisional application No. 62/991,149, filed on Mar. 18, 2020.

(51) Int. Cl.
*B05B 9/04* (2006.01)
*B05B 9/01* (2006.01)

(52) U.S. Cl.
CPC .............. *B05B 9/0416* (2013.01); *B05B 9/01* (2013.01); *B05B 9/0406* (2013.01)

(58) Field of Classification Search
CPC .... B05B 3/02; B05B 9/01; B05B 9/03; B05B 9/04; B05B 9/0403; B05B 9/0406; B05B 9/0416; B05B 9/08; B05B 9/0805; B05B 9/0855; B05B 9/0861; B05B 9/0866
See application file for complete search history.

(56) References Cited

U.S. PATENT DOCUMENTS

| | | | | | |
|---|---|---|---|---|---|
| 3,814,628 | A * | 6/1974 | Larkin | B05C 5/02 | 118/410 |
| 7,507,076 | B2 * | 3/2009 | McLeod | B05B 7/2464 | 418/48 |
| 10,022,742 | B2 * | 7/2018 | Goodwin | B05B 9/0861 | |
| 2012/0222708 | A1 * | 9/2012 | Quintard | B05B 13/0421 | 134/37 |
| 2016/0151799 | A1 * | 6/2016 | Reale | B05B 9/0416 | 239/526 |
| 2021/0162437 | A1 * | 6/2021 | Daubresse | C04B 28/10 | |

* cited by examiner

*Primary Examiner* — Darren W Gorman
(74) *Attorney, Agent, or Firm* — BOND, SCHOENECK & KING, PLLC; George R. McGuire

(57) ABSTRACT

A double tentacle pump system for a liquid sprayer includes first and second tentacle pumps positioned serially within a flow path that extends between a liquid container and the outlet of the sprayer. A motor is configured to actuate the first and second tentacle motors in response to a user directed trigger, thereby causing fluid to be moved from the container and expelled from the sprayer.

5 Claims, 5 Drawing Sheets

DOUBLE TENTACLE PUMP SYSTEM FOR A LIQUID SPRAYER

CROSS-REFERENCE TO RELATED APPLICATION

This application is a divisional application of U.S. application Ser. No. 17/171,391, filed Feb. 9, 2021, now allowed, which relates to U.S. Provisional Patent Application Ser. No. 62/991,149, filed on Mar. 18, 2020, and entitled “Sprayer Tentacle Pump,” the entire disclosure of which is incorporated herein by reference.

FIELD OF THE INVENTION

The present disclosure is directed generally to a liquid sprayer that employs a system of two tentacle pumps placed in series.

BACKGROUND

Applicant's related patent application identified above discloses a compact, electrically powered, ready-to-use sprayer comprising a novel single-pump system of spinning tentacle(s) and related components configured as a means to enable the dispensing and spraying of liquids of various viscosities with few moving parts and minimum energy.

An embodiment of the prior filed invention is presented in FIGS. 1 and 2. As shown in FIGS. 1A and 1B, wherein the liquid sprayer 10 is shown to employ a battery-powered electric motor 12 to drive a single tentacle pump 14 that coveys the liquid from the container (not shown) to the outlet spray nozzle 16.

FIG. 2A illustrates the prior filed invention's single tentacle pump 14, employed to convey liquid through a liquid flow path/conduit(s) extending from the container to the outlet nozzle 16, where it is dispensed as a liquid spray. In this embodiment, a single tentacle is employed; it is understood that multiple tentacles may be employed, as described in the prior disclosure.

FIG. 2B shows the means by which the spring-loaded shutoff valve 20 controls the flow of liquid through the sprayer. With the shutoff lever 22 depressed, an electrical contact switch (not shown) connects power from the battery 24 to the electric drive motor 12 that, in turn, spins the single tentacle pump 14 which then establishes the flow of liquid from the container and along and into the sprayer.

With the shutoff lever 22 continuing to be depressed as shown, the spring-loaded shutoff valve 20 becomes positioned such that an open flow path is established that enables the conveyed liquid to travel across the valve and out through the outlet nozzle 16.

FIG. 2C shows the means by which the spring-loaded shutoff valve 20 stops the flow of liquid through the sprayer. With the shutoff lever 22 released, the shutoff valve 20 becomes positioned such that the flow path across the valve is blocked. Simultaneously, the contact switch disconnects power to the drive motor 12, and flow from the liquid container to the sprayer is stopped.

SUMMARY

The present disclosure is directed to a double tentacle pump system for a liquid sprayer. This embodiment comprises a second tentacle pump, placed in series after the first tentacle pump. The sprayer on which this pump system is employed provides a compact ready-to-use handheld sprayer.

According to an aspect is a double tentacle pump system for a liquid sprayer, comprising a liquid reservoir; the liquid sprayer fluidly connected to the liquid reservoir and having an outlet; a fluid flow path extending from the liquid reservoir to the outlet; a first tentacle pump extending between the liquid reservoir and the sprayer within the fluid flow path; a second tentacle pump extending within the fluid flow path, downstream of the first tentacle pump; and at least one power supply for providing power to the first and second tentacle pumps.

According to an embodiment, the double tentacle pump system for a liquid sprayer further comprises a shut-off valve positioned within the flow path.

According to an embodiment, the double tentacle pump system for a liquid sprayer further comprises a trigger coupled to the shut-off valve and for moving the shut-off valve between open and closed positions.

According to an embodiment, the double tentacle pump system for a liquid sprayer further comprises a contact switch positioned within the sprayer and to which the shut-off valve moves into and out of electrical contact in response to the trigger moving the shut-off valve between its open and closed positions, respectively.

According to an embodiment, the double tentacle pump system for a liquid sprayer, wherein the first tentacle pump and the second tentacle pump each include one tentacle.

According to an aspect is a method for moving fluid through a fluid flow path extending from a container and through a sprayer for dispensing out of an outlet of the sprayer, comprising providing a first tentacle pump in the fluid flow path that is positioned to move fluid from the container into the sprayer; providing a second tentacle pump in the fluid flow path at a position downstream of the first tentacle pump to move fluid towards the outlet; and actuating the first and second tentacle pumps.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes a double tentacle pump system for a liquid sprayer.

Figure 1A:
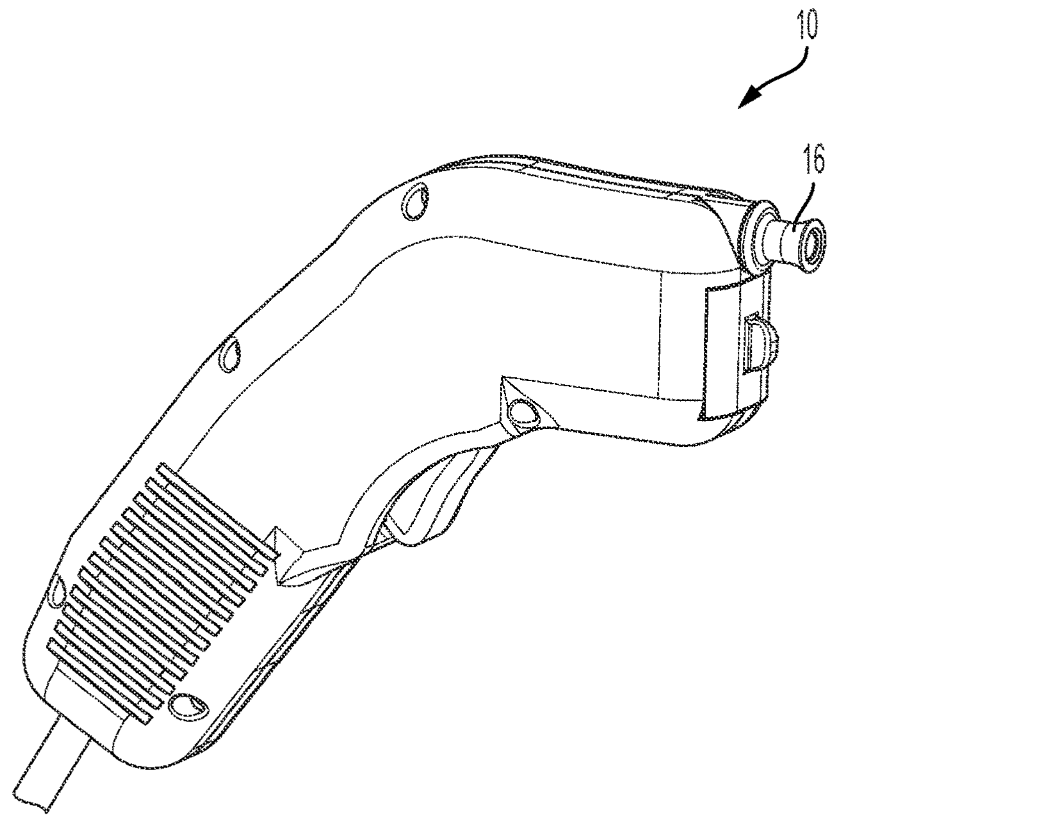
FIG. 1A is a perspective view of a sprayer tentacle pump, in accordance with an embodiment of a prior filed application.
Figure 1B:
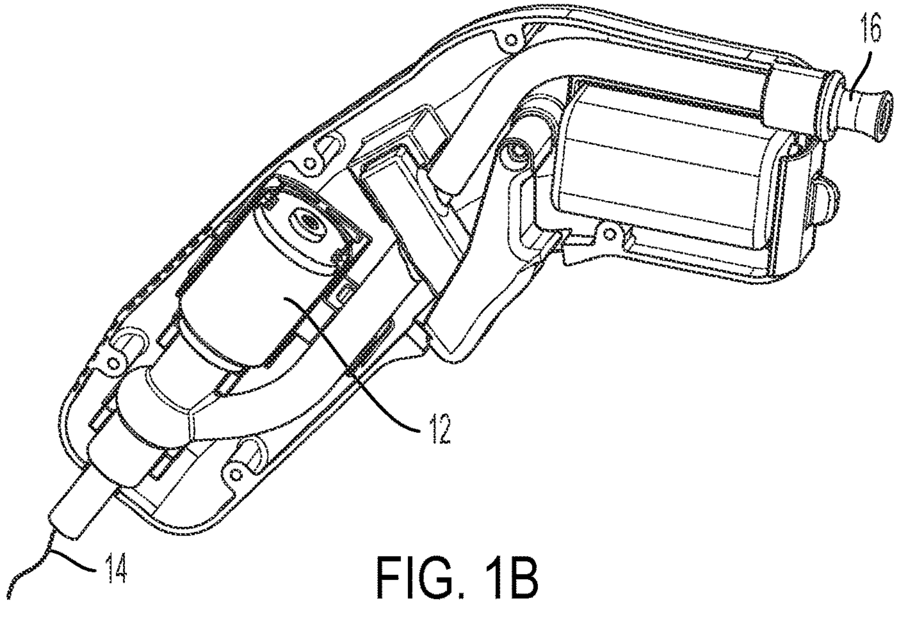
FIG. 1B is a cross-sectional view of a sprayer tentacle pump, in accordance with an embodiment of a prior filed application.
Figure 2A:
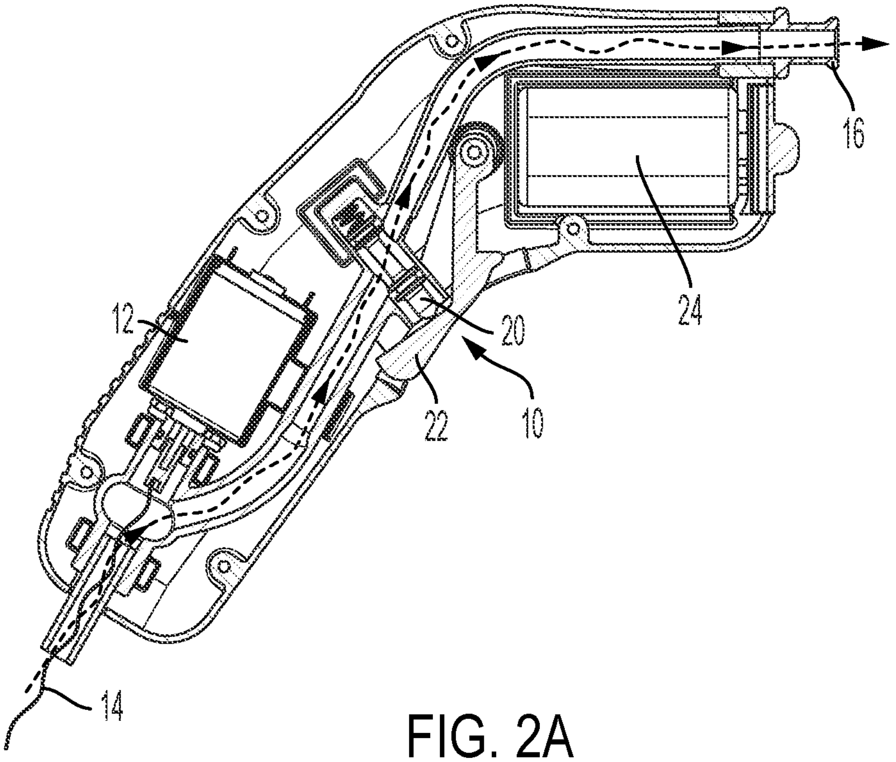
FIG. 2A is a cross-sectional view of a sprayer tentacle pump illustrating fluid flow paths, in accordance with an embodiment of a prior filed application.
Figure 2B:
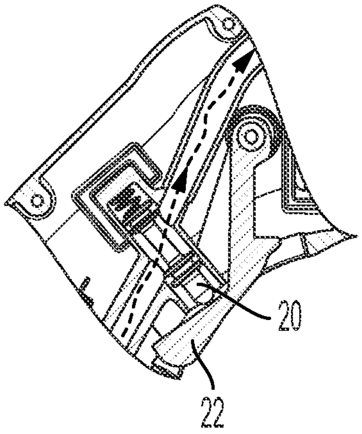
FIG. 2B and FIG. 2C are detailed views of a shut-off valve in an open and a closed position, respectively, in accordance with an embodiment of a prior filed application.
Figure 2C:
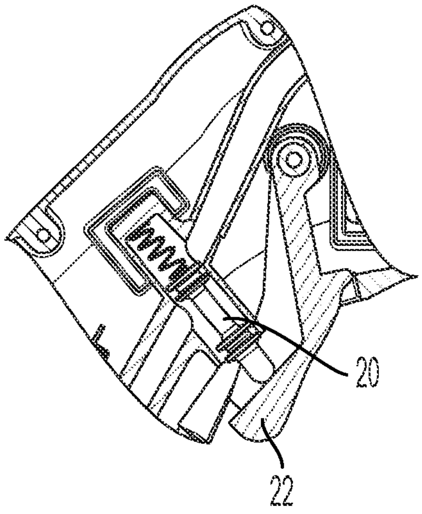
Figure 3:
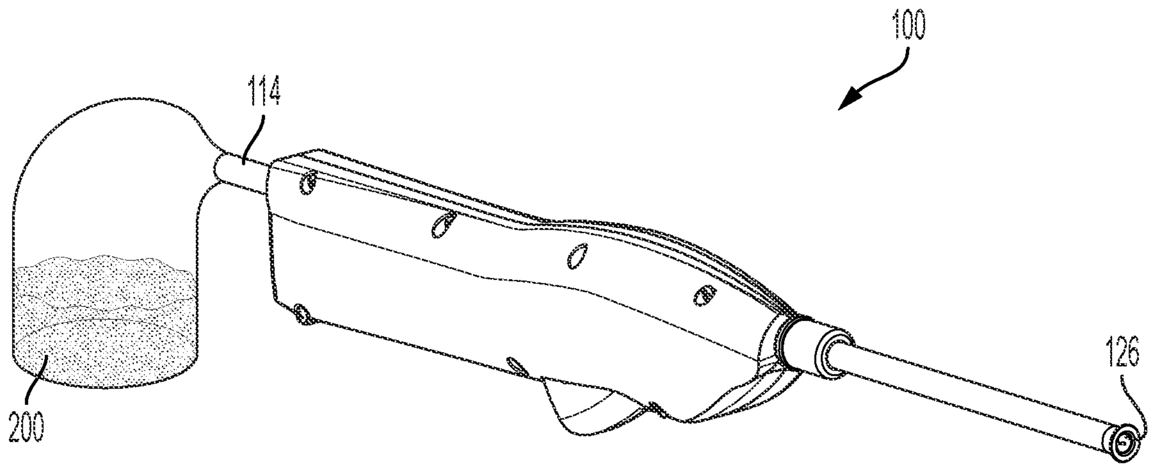
FIG. 3 is a perspective view of a sprayer with a tentacle pump, in accordance with an embodiment.
Figure 4:
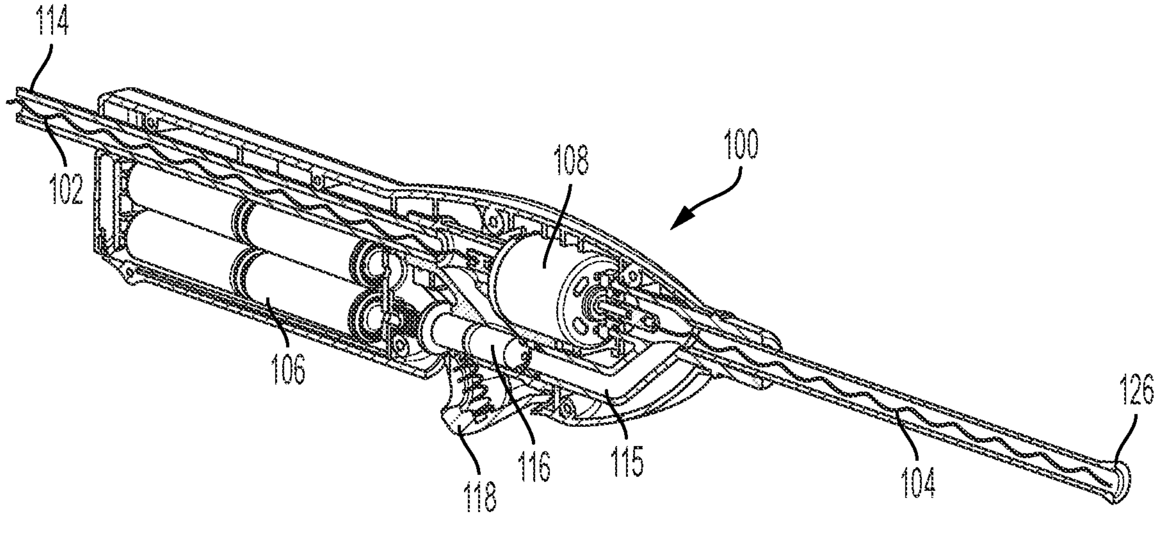
FIG. 4 is a cross-sectional view of a sprayer with a tentacle pump, in accordance with an embodiment.

Referring to FIG. 3, in one embodiment, a sprayer 100 provides a compact ready-to-use handheld sprayer. As shown in FIGS. 4 and 5, this sprayer 100 comprises a system of two tentacle pumps 102, 104 and related components configured in series placement as a means to enable and further enhance the dispensing and spraying of liquids of various viscosities with few moving parts and minimum energy.

As illustrated in FIG. 4, a battery/ies 106 provides power to a single dual-drive electric motor 108 that is configured/connected to simultaneously drive on one end the primary tentacle pump 102 and, at the opposite end, the secondary tentacle pump 104. In this embodiment, primary tentacle pump 102 includes a single primary tentacle and secondary tentacle pump 104 includes a single secondary tentacle; as in the prior filed application, it is understood that multiple tentacles may be employed for one or both pumps.

In operation, the motor-driven primary tentacle pump 102 conveys the liquid from the container 200 to the handheld sprayer 100 via the inlet hose 114. The liquid, then continuing in a flow path 115 that extends between container 200 and an outlet nozzle 126 to flow past the open shutoff valve 116, interacts with the serially configured motor-driven secondary tentacle pump 104.

With its serial placement within the flow path, this second tentacle pump 104 provides additional, downstream conveyance to the liquid flow and thus further enhances the ability of the sprayer 100 to dispense and spray liquids of various viscosities with few moving parts and minimum energy.

Figure 5A:
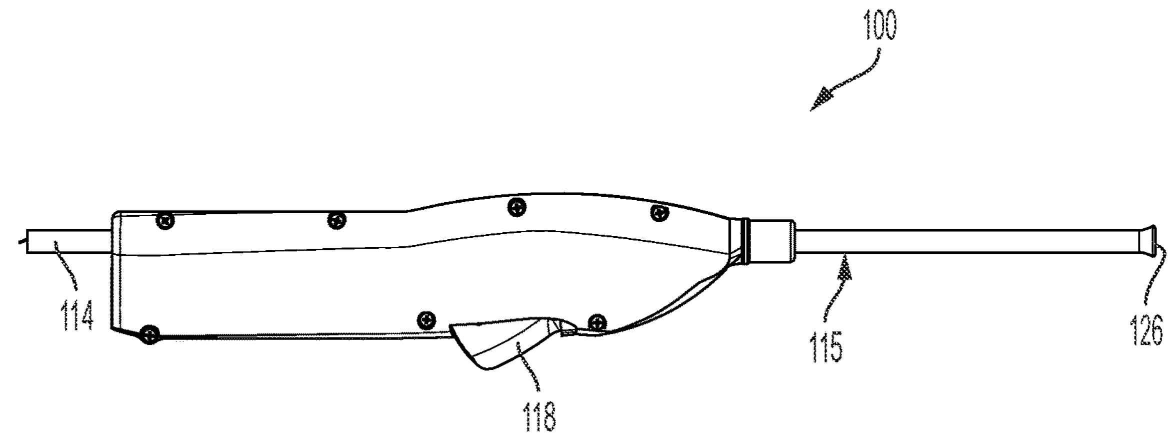
FIGS. 5A, 5B, 5C, and 5D are side elevation, cross-sectional, and enlarged, partial cross-sectional showing trigger depressed and partial, cross-sectional showing trigger released views, respectively, of a sprayer with a tentacle pump, in accordance with an embodiment.
Figure 5B:
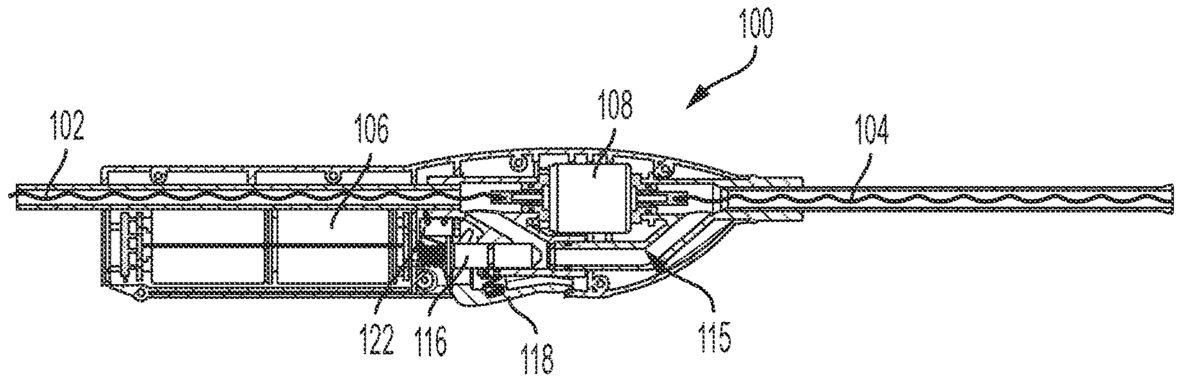
Figure 5C:
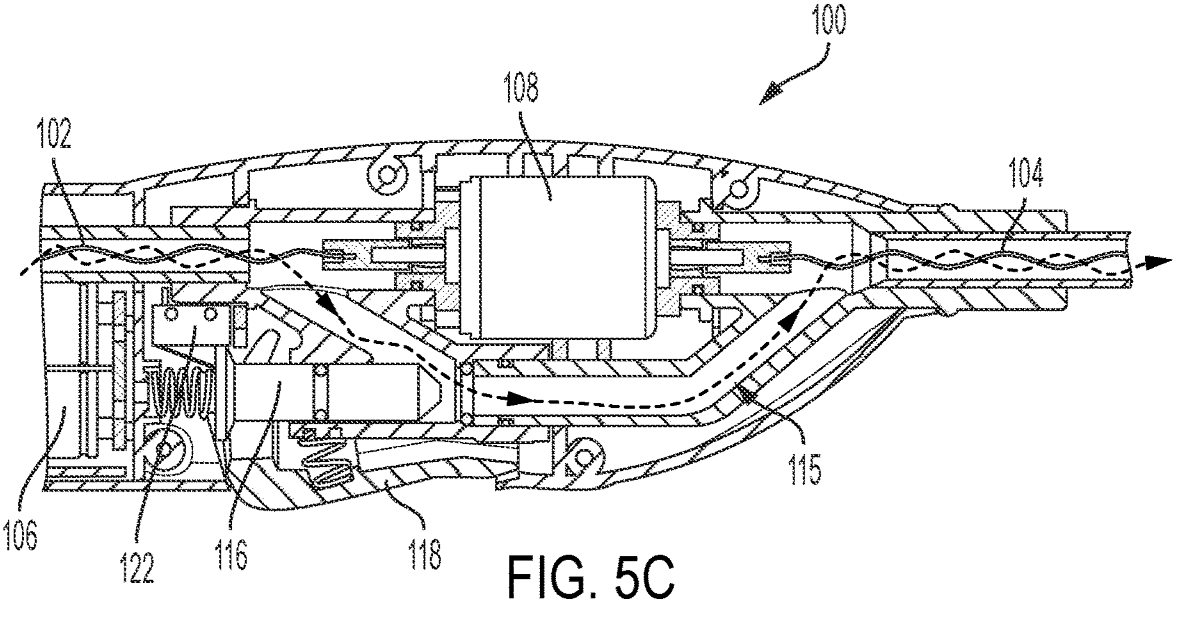

FIG. 5A shows a profile view of the disclosed sprayer 100. FIG. 5B shows a partial profile section view of the disclosed sprayer 100, with shutoff lever 118 depressed. FIG. 5C shows a detail partial profile section view of the disclosed sprayer 100 that illustrates the flow of the conveyed liquid.

Figure 5D:
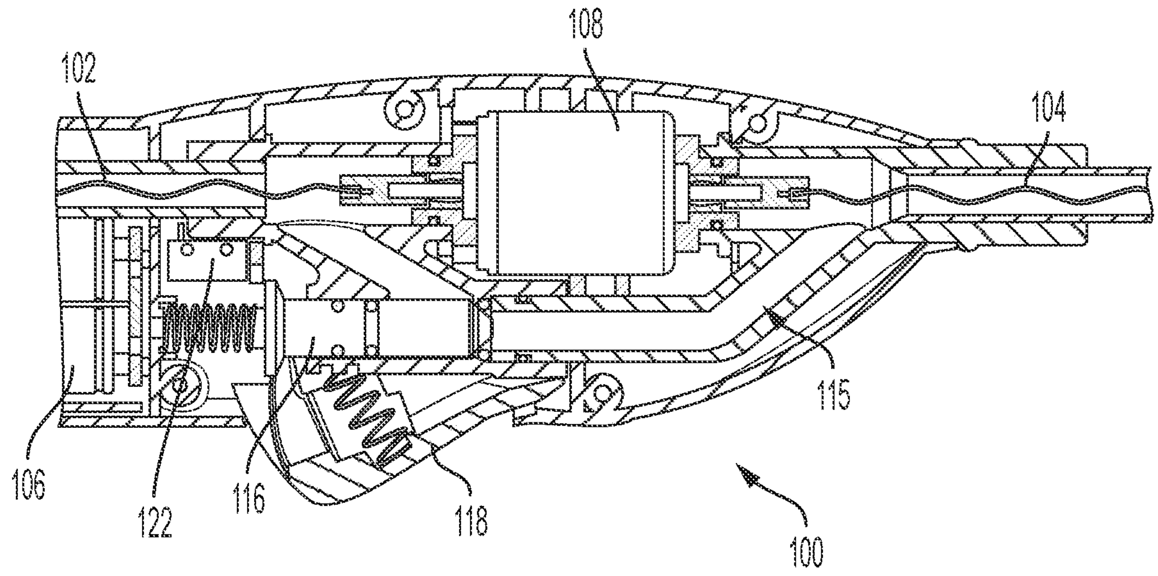

FIGS. 5C and 5D show the means by which the spring-loaded shutoff valve 116 and two serially-configured tentacle pumps 102, 104 control the flow of liquid through the sprayer 100.

With the shutoff lever 118 depressed, as shown in FIG. 5C, an electrical contact switch 122 connects power from the battery 106 to the dual drive electric motor 108 that, in turn, spins both the primary tentacle pump 102 and the secondary tentacle pump 104, which then establishes the flow of liquid from the container 200, through the flow path 115 and ultimately out of sprayer 100 through nozzle outlet 126.

With continued reference to FIG. 5C, the depressed shutoff lever 118 positions the spring-loaded shutoff valve 116 such that, as shown, an open flow path is established that enables the conveyed liquid to travel across the valve and then interact serially with the secondary tentacle pump 104.

The secondary tentacle pump 104 enhances the flow provided by the primary tentacle pump 102. In effect, the primary tentacle pump 102 pulls the liquid from the container along and into the handheld sprayer 100, and the secondary tentacle pump 104, in enhanced serial fashion, then pushes the liquid outward through the outlet nozzle 126.

FIG. 5D shows the means by which the spring-loaded shutoff valve 116 stops the flow of liquid through the sprayer 100. With the spring-loaded shutoff lever 118 now released, the shutoff valve 116 becomes positioned such that the flow path across the valve is blocked. Simultaneously, contact switch 122 disconnects power to the dual-drive electric motor 108, and flow from the liquid container to the sprayer 100 is stopped.

This system of two tentacle pumps, beneficially configured to enable serial liquid flow and driven by a dual-drive electric motor, provides for a compact, electrically powered ready-to-use handheld sprayer uniquely configured to provide for the dispensing and spraying of liquids of various viscosities with few moving parts and minimum energy.

With this embodiment herein disclosed, additional configurations are now presented as further means to achieve the effectiveness of this sprayer system.

One embodiment contemplated is for the second tentacle pump 104 to be driven separately by a second electric motor (not shown), rather than driven by the application of a single dual-drive electric motor, such that the system is not limited to a single electric motor.

Also contemplated for the system are multiple tentacle pumps that may be configured for either series or parallel flow, with each pair of pumps either driven by a dual-drive electric motor, or each single pump separately driven by the application of a single electric motor.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for moving fluid through a singular fluid flow path extending from a container and through a sprayer for dispensing out of an outlet of the sprayer, comprising:

a. providing a first tentacle pump in the singular fluid flow path that is positioned to move fluid from the container into the sprayer;

b. providing a second tentacle pump in the singular fluid flow path at a position downstream of the first tentacle pump to move fluid towards the outlet; and c. actuating the first and second tentacle pumps.

2. The method according to claim 1 further comprising:

d. providing a shut-off valve positioned within the singular flow path.

3. The method of claim 2 wherein the shut-off valve comprises a trigger configured to move the shutoff valve between open and closed positions.

4. The method of claim 3 wherein the sprayer comprises a contact switch to which the shut-off valve moves into and out of electrical contact in response to the trigger moving the shut-off valve between its open and closed positions, respectively.

5. The method of claim 1 wherein the first tentacle pump and the second tentacle pump each include at least one tentacle.

* * * * *